United States Patent
Morita

(10) Patent No.: US 9,262,128 B2
(45) Date of Patent: Feb. 16, 2016

(54) INFORMATION PROCESSING APPARATUS, INFORMATION PROCESSING METHOD AND COMPUTER PROGRAM

(75) Inventor: Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/130,023

(22) PCT Filed: Jun. 29, 2012

(86) PCT No.: PCT/JP2012/066721
§ 371 (c)(1),
(2), (4) Date: Dec. 30, 2013

(87) PCT Pub. No.: WO2013/008650
PCT Pub. Date: Jan. 17, 2013

(65) Prior Publication Data
US 2014/0136854 A1    May 15, 2014

(30) Foreign Application Priority Data
Jul. 8, 2011  (JP) ................. 2011-152105

(51) Int. Cl.
*H04L 29/00* (2006.01)
*G06F 9/44* (2006.01)
*G06F 21/60* (2013.01)
*G06F 9/455* (2006.01)

(52) U.S. Cl.
CPC .. *G06F 8/31* (2013.01); *G06F 8/30* (2013.01); *G06F 9/4423* (2013.01); *G06F 9/45508* (2013.01); *G06F 21/602* (2013.01)

(58) Field of Classification Search
CPC ................... H04L 9/00; G06F 12/14
USPC .......................................... 713/189
See application file for complete search history.

(56) References Cited

U.S. PATENT DOCUMENTS

| 8,516,458 B2 | 8/2013 | Stewart et al. |
| 2006/0218196 A1 | 9/2006 | Kurita |
| 2011/0276806 A1* | 11/2011 | Casper et al. ............... 713/189 |
| 2013/0339750 A1* | 12/2013 | Amit et al. ................... 713/189 |

FOREIGN PATENT DOCUMENTS

| JP | 3-92931 | 4/1991 |
| JP | 2011-027625 A | 2/2011 |

(Continued)

OTHER PUBLICATIONS

Takashi Yuasa, "S Shiki no Tameno Moji Tanmatsu-yo Interface", IPSJ SIG Notes, Mar. 12, 1990, vol. 90, No. 22 (90-SYM-54), pp. 1 to 8 (particularly, '5.1 Kansu inspect ni yoru Object Chosa').

(Continued)

*Primary Examiner* — Jeffrey Pwu
*Assistant Examiner* — Michael D Anderson
(74) *Attorney, Agent, or Firm* — Hazuki International, LLC

(57) ABSTRACT

Provided is an information processing apparatus including a program execution unit configured to read, interpret and execute a code of a computer program that is created in a procedural language, and a backup unit configured to create a backup in a format in which a variable definition and a function definition in the code being executed by the program execution unit are interpretable as a code in the procedural language.

8 Claims, 11 Drawing Sheets

(56) References Cited

FOREIGN PATENT DOCUMENTS

JP 2011-513824 A 4/2011
WO 2005/121976 A1 12/2005

OTHER PUBLICATIONS

Yuasa, Kei, Character Terminal Interface for S-expression, Tokyo Research Laboratory Matsushita Electric Industrial Co. Ltd. 3-10-1 Higashimita Tama-ku Kawasaki 214 Japan; pp. 1-8, Mar. 12, 1990.

* cited by examiner

- NAME (pname) — 401
- VARIABLE DEFINITION (value) — 402
- FUCTION DEFINITION (function) — 403
- SECURITY ATTRIBUTE — 404

400

410

| 411 | 412 |
|---|---|
| car0 | cdr0 |
| car1 | cdr1 |
| car2 | cdr2 |
| car3 | cdr3 |
| car4 | cdr4 |
| car5 | cdr5 |
| car6 | cdr6 |
| car7 | cdr7 |
| car8 | cdr8 |
| car9 | cdr9 |

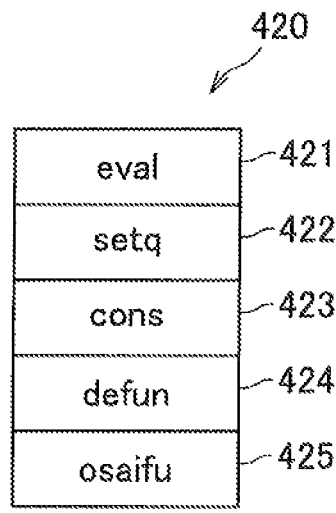
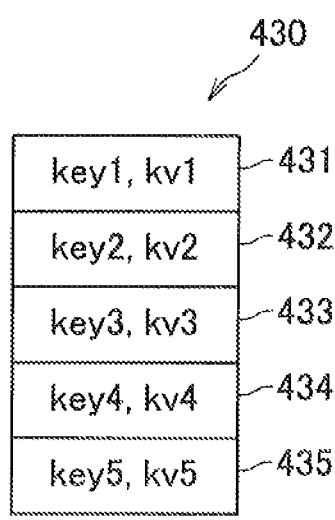

INFORMATION PROCESSING APPARATUS, INFORMATION PROCESSING METHOD AND COMPUTER PROGRAM

CROSS-REFERENCE TO RELATED APPLICATION

The present application is a national phase entry under 35 U.S.C. §371 of International Application No. PCT/JP2012/066721 filed Jun. 29, 2012, published on Jan. 17, 2013, as WO 2013/008650 A1, which claims priority from Japanese Patent Application No. JP 2011-152105 filed in the Japanese Patent Office on Jul. 8, 2011.

TECHNICAL FIELD

The present invention relates to an information processing apparatus, an information processing method and a computer program.

BACKGROUND ART

In procedural programming languages such as LISP, Ruby and Python, the definition information about variables and functions is read at the time of execution of a program, and the program is executed based on the read function definitions and variable values. The software for interpreting and executing such a procedural programming language reads an application program that is described in the procedural programming language, at every time of startup, and thereafter, processes input data and outputs a processing result in accordance with the read application program.

As a feature of the software for interpreting and executing a procedural programming language, once a defined variable name is input, the content of the variable can be read out, and once a function for reading a defined function is input, the function code can be output.

CITATION LIST

Patent Literature

Patent Literature 1: National Publication of International Patent Application No. 2011-513824
Patent Literature 2: International Publication No. WO 2005/121976

SUMMARY OF INVENTION

Technical Problem

A feature of the software for interpreting and executing a procedural programming language is to have means by which once a defined variable name is input, the content of the variable is read out, and once a function for reading a defined function is input, the function code is output. However, when the output information is input with no change, the software has not been able to interpret it similarly to the original definitional expression.

For creating a program, typically, an editing program for editing the program is started, and a source code of the program is described, so that a file in which the source code of the program is described is created. Thereafter, a processing program for interpreting the source code is started, and the program is executed, and then, if the program needs to be modified, the editing using the editing program is repeated again. Thus, there is a need for multiple steps in which an editing and a modifying are repeated, before the program can be actually used.

Hence, the present disclosure has been made in view of the above problem. An object of the present disclosure is to provide a novel and improved information processing apparatus, information processing method and computer program that make it possible to easily perform a development in a procedural programming language.

Solution to Problem

According to an embodiment of the present disclosure, there is provided an information processing apparatus including a program execution unit configured to read, interpret and execute a code of a computer program that is created in a procedural language, and a backup unit configured to create a backup in a format in which a variable definition and a function definition in the code being executed by the program execution unit are interpretable as a code in the procedural language.

According to the present disclosure, a program execution unit reads, interprets and executes a code of a computer program that is created in a procedural language. Then, a backup unit creates a backup in a format in which a variable definition and a function definition in the code being executed by the program execution unit is interpretable as a code in the procedural language. Accordingly, while a program is being executed by the program execution unit based on the code, the direct variable definition and the function definition are modified so that these definitions can be backed up and the code can be read again in a shorter time. It becomes possible to easily perform a development in a procedural programming language.

According to the present disclosure, there is provided an information processing method including interpreting and executing a code of a computer program that is created in a procedural language, and creating a backup in a format in which a variable definition and a function definition in the code being executed is interpretable as a code in the procedural language.

According to the present disclosure, there is provided a computer program for causing a computer to execute interpreting and executing a code of a computer program that is created in a procedural language, and creating a backup in a format in which a variable definition and a function definition in the code being executed are interpretable as a code in the procedural language.

Advantageous Effects of Invention

As described above, according to the present disclosure, it is possible to provide a novel and improved information processing apparatus, information processing method and computer program that make it possible to easily perform a development in a procedural programming language.

BRIEF DESCRIPTION OF DRAWINGS

FIG. 5 is an explanatory diagram showing an exemplary structure of a name storage table 420 for storing a name that is stored in a name region 401 of the symbol 400.

FIG. 6 is an explanatory diagram showing an exemplary structure of an authentication key table 430 for storing an authentication key.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Descriptions will be given in the following order.
<1. Conventional program development model>
<2. An embodiment of the present disclosure>
[2-1. Functional configuration of information processing system]
[2-2. Exemplary program structure]
[2-3. Behavior of information processing apparatus]
[2-4. Modifications]
[2-5. Hardware configuration of information processing apparatus]
<3. Conclusion>
<1. Conventional Program Development Model>

Figure 1:
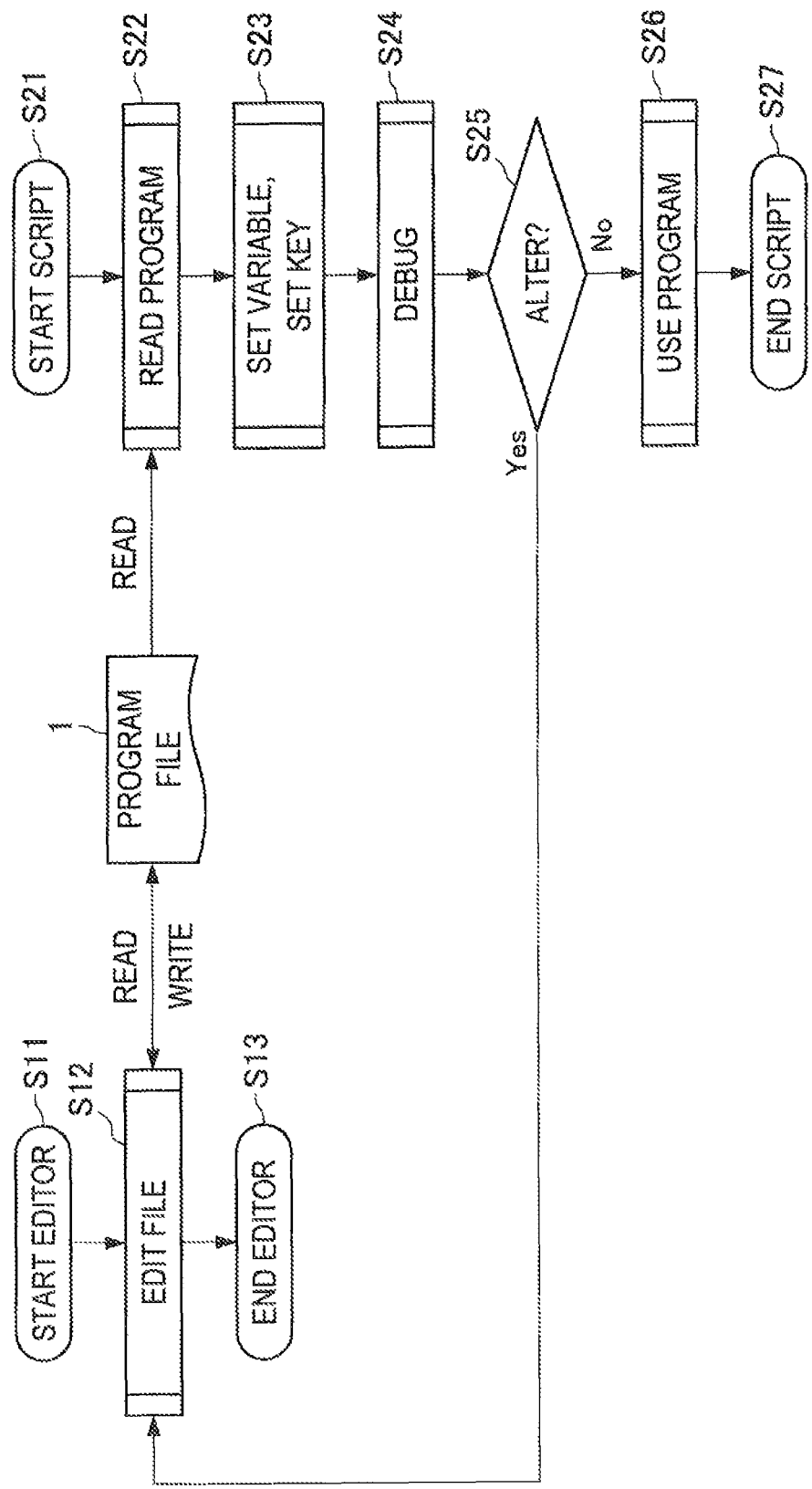
FIG. 1 is an explanatory diagram showing a flow of a conventional program development model.

Before preferred embodiments of the present disclosure are described in detail, first, a conventional program development model and problems thereof will be described. FIG. 1 is an explanatory diagram showing a flow of a conventional program development model, which is implemented based on a technology that the present discloser discloses in Japanese Patent Application No. 2011-027625. In the following, the conventional program development model will be described using FIG. 1.

For creating a source code of a program, first, a creator of the source code starts an editor for editing the source code (step S11), and using the started editor, edits a program file 1 in which the source code is to be described (step S12). When the creator of the source code has finished the editing of the program file 1 using the editor, the creator of the source code exits the editor (step S13).

Once the creator of the source code has created the program file 1 in which the source code is described, the source code described in the program file 1 is interpreted by a program (script) for interpreting the source code, and a process based on the source code is executed. Once the script is started (step S21), the script reads the program file 1 (step S22), and then, sets variables described in the program file 1 and sets keys for using the variables (step S23). These variable setting and key setting are based on the technology that the present discloser discloses in Japanese Patent Application No. 2011-027625.

Once the program is read by the script and the variable setting and key setting are performed, the program is debugged (step S24). As a result of the debug, whether the program needs to be altered is judged (step S25), and if the judgment that the program needs to be altered is made, the creator of the source code goes back to the editing of the program file 1 in which the source code is described, again. On the other hand, if the judgment that the program does not need to be altered is made, the program is used with no change (step S26). Then, the script is exited for ending the use of the program (step S27).

Thus, conventionally, the development of a program is performed by repeating the editing of the source code and the debug of the program. However, in such a program development model, it is impossible to perform a debug in a state in which the program file 1 is read in the script, and for modifying the source code, it is necessary to start the editor again and go back to the editing of the source code with the editor. Therefore, in the conventional program development model, it is impossible to perform a prompt debug. Also, when intending to add a function to the program, similarly, it is necessary to go back to the editing of the source code, and a successive-addition-type program development is impossible.

Furthermore, there is also a problem in that when the script reads the source code once, it is impossible to restore the original definition. For example, suppose the case where, in Scheme that is a script language of the Lisp family, using the "define" for defining the value of a variable, the value of a variable a is defined as (define a 123). In this case, after a reading of the above source code "(define a 123)", if the "a" is input for referring the value of the variable a, the "123" that is the value stored in the variable a is returned. However, after the source code is once read, even if attempting to restore the definitional expression of the variable a from The variable a and its value, it is impossible to restore the (define a 123) that is the original definitional expression.

Similarly, in the case of a function, for example, a function "add3" can be defined as (define (add3 x) (+x3)), but even if inputting a code readout function, the original definitional expression is not restored. For example, in the case of a function, although there is a command "get-closure-code" that allows for an acquisition of a program code as data in Scheme, even if executing this command, in the above function "add3", the (get-closure-code add3)=>(lambda (x) (+x 3)), which is a definitional expression different from the above-described original definitional expression, is acquired.

In a system by the technology that the present discloser discloses in Japanese Patent Application No. 2011-027625, it is possible to partially modify a program anytime, and to freely read out the source code of the program and the values of the internal variables. In the technology that the present discloser discloses in Japanese Patent Application No. 2011-

027625, a security measure is taken in a tamper resistant IC chip, by a security flag, encrypted communication means and a non-volatile memory. However, in a large-scale system, a high-capacity non-volatile memory is expensive, and a need to take a security measure at a lower cost is desired.

However, in the above technology, the software for interpreting and executing the script requires steps for reading the script program at every time of startup, interpreting the content of the script to replace it with an internal expression, and thereafter performing many security settings such as secret keys. Thereby, there are concerns that procedures after startup are complicated, and the script program to be read and the secret keys need to be strictly managed.

For example, as disclosed in Patent Literature 2, a technology for encrypting and saving the internal information of an apparatus has been developed. However, in this technology, in which program data are saved in the interior of the apparatus using a non-volatile memory, the saving is limited to resulting data by a program behavior, and dynamic alterations of the program are not considered. Therefore, this technology cannot solve the above-described problems in a configuration with no structure for saving the program to a non-volatile memory.

Hence, in an embodiment of the present disclosure described hereinafter, a technology in which, even after the source code is once read in the script and further the source code is altered, the up-to-date source code can be restored, will be described. Furthermore, a technology that, by simplifying procedures after startup, makes it possible to faster the restart of the program, compared to the technology that the present discloser discloses in Japanese Patent Application No. 2011-027625, will be described.

<2. An Embodiment Of The Present Disclosure>
[2-1. Functional Configuration of Information Processing System]

Figure 2:
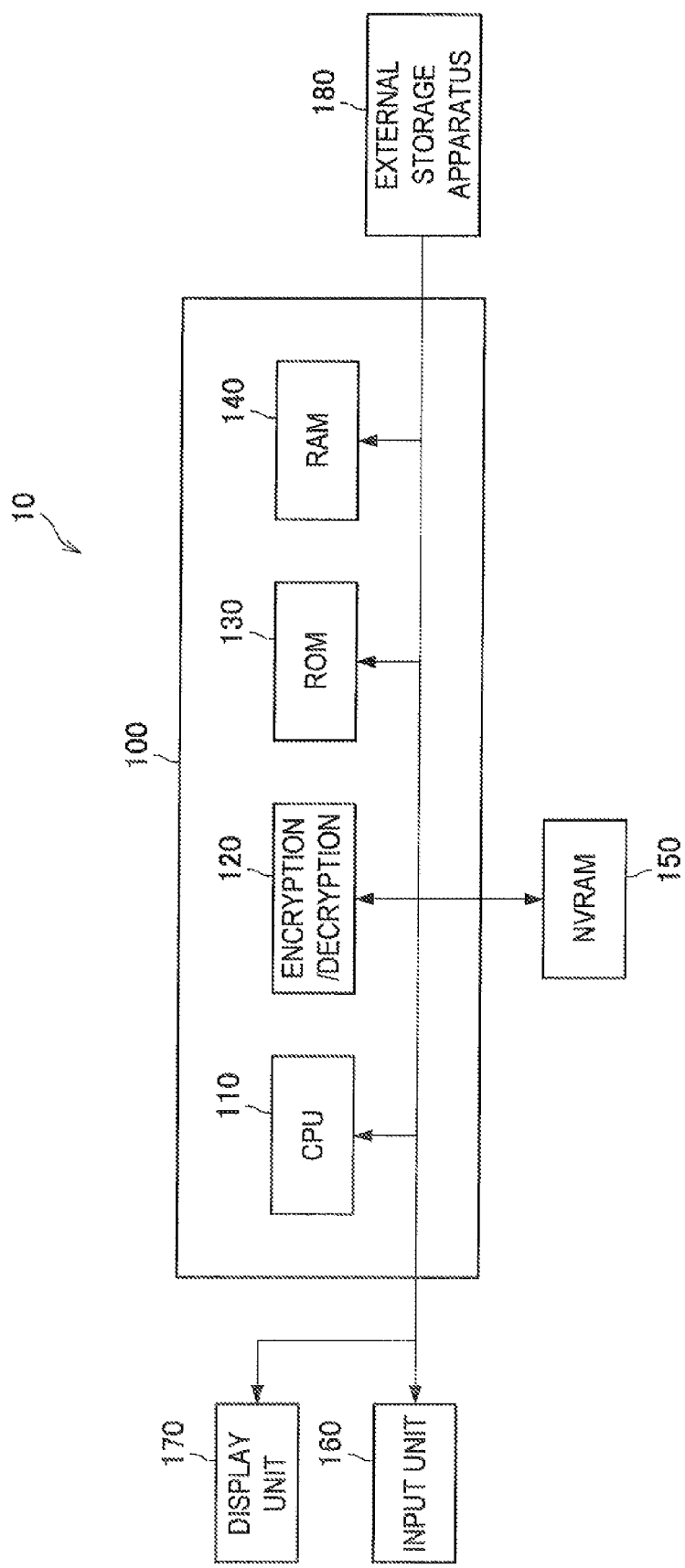
FIG. 2 is an explanatory diagram showing a functional configuration of an information processing system 10 according to an embodiment of the present disclosure.

First, a functional configuration of an information processing system according to an embodiment of the present disclosure will be described. FIG. 2 is an explanatory diagram showing the functional configuration of the information processing system 10 according to an embodiment of the present disclosure. In the following, the functional configuration of the information processing system 10 according to an embodiment of the present disclosure will be described using FIG. 2.

As shown in FIG. 2, the information processing system 10 according to an embodiment of the present disclosure is configured to include an information processing apparatus 100 to execute a program, an NVRAM (Non Volatile Rondom Access Memory) 150, an input unit 160, a display unit 170 and an external storage apparatus 180.

The information processing apparatus 100 is configured so as to be capable of interpreting and executing a procedural programming language. Examples of such a programming language include LISP, Scheme, Ruby and Python.

As shown in FIG. 2, the information processing apparatus 100 is configured to include a CPU (Central Prosessing Unit) 110, an encryption/decryption unit 120, a ROM 130 and a RAM 140.

The CPU 110 controls the behavior of the information processing apparatus 100, and by executing a readout command of operating system software that is previously recorded in the ROM 130, can execute the operating system. In the execution of the operating system, the CPU 110 can use the RAM 140 as a work area. Here, the operating system software recorded in the ROM 130 is, for example, one that can interpret and execute a procedural programming language as described above. In the present disclosure, it is allowable to be such a manner that a procedural program is read from the external storage apparatus 180 to be executed.

As for a program to be read from the ROM 130 of the information processing apparatus 100 according to the embodiment, a program to which a security feature is added along with a processing as an interpreter that is a basic feature for the above procedural programming language, is stored. Thereby, when embedding an application program to the information processing apparatus 100, it is unnecessary to compile it in advance, and since the security feature is added, the debug can be performed in the information processing apparatus 100 itself in which the application is utilized. This leads to a reduction of development steps and allows the application program to be developed in a short period.

The encryption/decryption unit 120 performs an encryption process for input data using a designated key to output it, and performs a decryption process for input encryption data using a designated key to output it. In the embodiment, a source code is encrypted when the source code is saved to the external storage apparatus 180, and the source code that is stored in the external storage apparatus 180 in a state of being encrypted is decrypted. The key that the encryption/decryption unit 120 uses for the encryption and decryption of the source code is stored in the NVRAM 150.

The input unit 160 is connected to the information processing apparatus 100, and receives an input operation to the information processing apparatus 100 by a user. The input unit 160 may be constituted by, for example, a keyboard, a mouse, a touch panel and the like. The display unit 170 is connected to the information processing apparatus 100, and displays an information processing result in the CPU 110 of the information processing apparatus 100, based on a process of the CPU 110. The display unit 170 may be constituted by, for example, a flat display device such as a liquid-crystal display and an organic EL display.

The external storage apparatus 180 is connected to the information processing apparatus 100, and stores various data that are used in the information processing apparatus 100. The display unit 170 may be constituted by a hard disk, for example.

In the embodiment, a script interpretation and execution module (referred to as a "list processing module", also) that can interpret and execute the procedural programming language, and a source code that the script interpretation and execution module reads and executes, are stored in the external storage apparatus 180. This source code is stored in a state of being encrypted by the encryption/decryption unit 120. Since the source code is stored in the external storage apparatus 180 in a state of being encrypted by the encryption/decryption unit 120, it is possible to enhance the confidentiality of the source code.

In FIG. 2, the NVRAM 150, the input unit 160 and the display unit 170 are shown so as to be provided in the exterior of the information processing apparatus 100, but the present disclosure is not limited to this example. That is, at least one of the NVRAM 150, the input unit 160 and the display unit 170 may be configured to be provided in the interior of the information processing apparatus 100. So far, the hardware configuration of the information processing apparatus 100 according to an embodiment of the present invention has been described using FIG. 2. Next, a structure of a computer program that is executed by the information processing apparatus 100 shown in FIG. 2, will be described.

[2-2. Exemplary Program Structure]

FIGS. 3 to 6 are explanatory diagrams showing an exemplary structure of a computer program that is executed by the information processing apparatus 100 according to an embodiment of the present invention. In the following, an exemplary structure of the computer program that is executed by the information processing apparatus 100 according to an embodiment of the present invention will be described using FIGS. 3 to 6.

Hereinafter, if not otherwise specified, descriptions will be given on the premise that the language of the computer program that is executed by the information processing apparatus 100 is LISP. However, in the present disclosure, a language that can be used as the computer language is not limited to this example, and it is allowable to be any procedural programming language if it allows for a configuration in which the security can be set independently for each variable and for each function, in the expanded feature or standard feature.

Figures 3, 4:
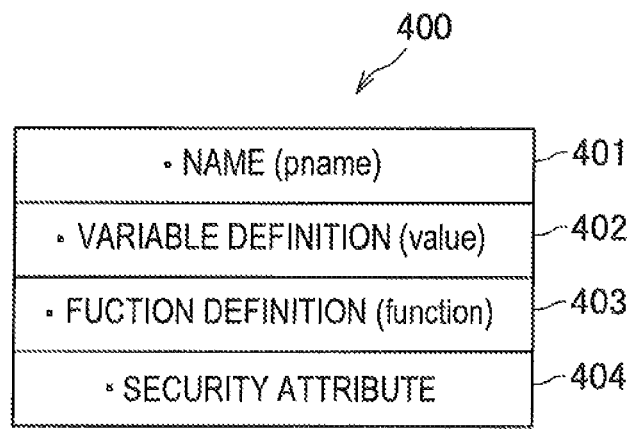
FIG. 3 is an explanatory diagram showing a data structure that can be defined by a list processing module and is called a symbol.
FIG. 4 is an explanatory diagram showing an exemplary configuration of cons cells 410 for constructing a list structure.

In the execution of the computer program, the CPU 120 loads the list processing module for interpreting and executing the source code of the program that is developed in the information processing apparatus 100 and is embedded to the information processing apparatus 100. FIG. 3 is an explanatory diagram showing a data structure that can be defined by the list processing module and is called a symbol.

As shown in FIG. 3, the symbol 400 that can be defined by the list processing module is constituted by a name region 401, a variable definition region 402, a function definition region 403 and a security attribute region 404.

The name region 401 indicates a printable string table. The name region 401, if the symbol specifies a variable, stores the variable name, and, if the symbol specifies a function, stores the function name. In FIG. 3, the name region 401 is indicated as "pname."

The variable definition region 402, if the symbol specifies a simple variable, stores the value, and, if the symbol specifies a list variable, stores the value indicating the list. In FIG. 3, the variable definition region 402 is indicated as "value."

The function definition region 403, if the symbol specifies a function, stores the function substance. In FIG. 3, the function definition region 403 is indicated as "function."

The security attribute region 404 stores the information relevant to the security attribute of the symbol. Examples of the security attribute include the readout attribute of the variable, the alteration attribute of the variable, and the execution attribute of the function. The security attribute region 404 stores an access flag showing an access permission to the symbol, and a value indicating a table that stores an authentication key for accessing the symbol.

In addition to the symbol 400 shown in FIG. 3, called cons cells, cells for constructing a list structure are defined serially. FIG. 4 is an explanatory diagram showing an exemplary configuration of the cons cells 410 for constructing the list structure. As shown in FIG. 4, the cons cell 410 is an object including two pointers, called a CAR slot 411 and a CDR slot 412. In FIG. 4, the car0 to car9 are shown as the CAR slots 411, and the cdr0 to cdr9 are shown as the CDR slots 412. Naturally, it goes without saying that the number of each slot is not limited to this example.

A table for storing a name that is stored in the name region 401 of the symbol 400 is also provided. FIG. 5 is an explanatory diagram showing an exemplary structure of a name storage table 420 for storing the name that is stored in the name region 401 of the symbol 400. In the name storage table 420 shown in FIG. 5, names "eval", "setq", "cons", "defun" and "osaifu" are stored, and they correspond to the symbols that are their substances, on a one-to-one basis. Reference numeral 421 denotes a region for storing the name "eval", reference numeral 422 denotes a region for storing the name "setq", reference numeral 423 denotes a region for storing the name "cons", reference numeral 424 denotes a region for storing the name "defun", and reference numeral 425 denotes a region for the name "osaifu". Once a symbol name is input to the name storage table 420 from the exterior of the name storage table 420, the symbol corresponding to the input symbol name, which is stored in the name storage table 420, is indicated and evaluated. Here, the "osaifu" is a variable showing the balance of an electronic money when an electronic money feature is incorporated into the information processing apparatus 100.

Then, a table corresponding to a value that is stored in the security attribute region 404 of the symbol 400 and that indicates a table for storing the authentication key, is also provided. FIG. 6 is an explanatory diagram showing an exemplary structure of an authentication key table 430 for storing the authentication key. FIG. 6 shows a state in which authentication keys are managed by version numbers (kv1 to kv5) in the authentication key table 430. Reference numeral 431 denotes a region for storing a key "key1", reference numeral 432 denotes a region for storing a key "key2", reference numeral 433 denotes a region for storing a key "key3", reference numeral 434 denotes a region for storing a key "key4", and reference numeral 435 denotes a region for storing a key "key5".

Figure 7:
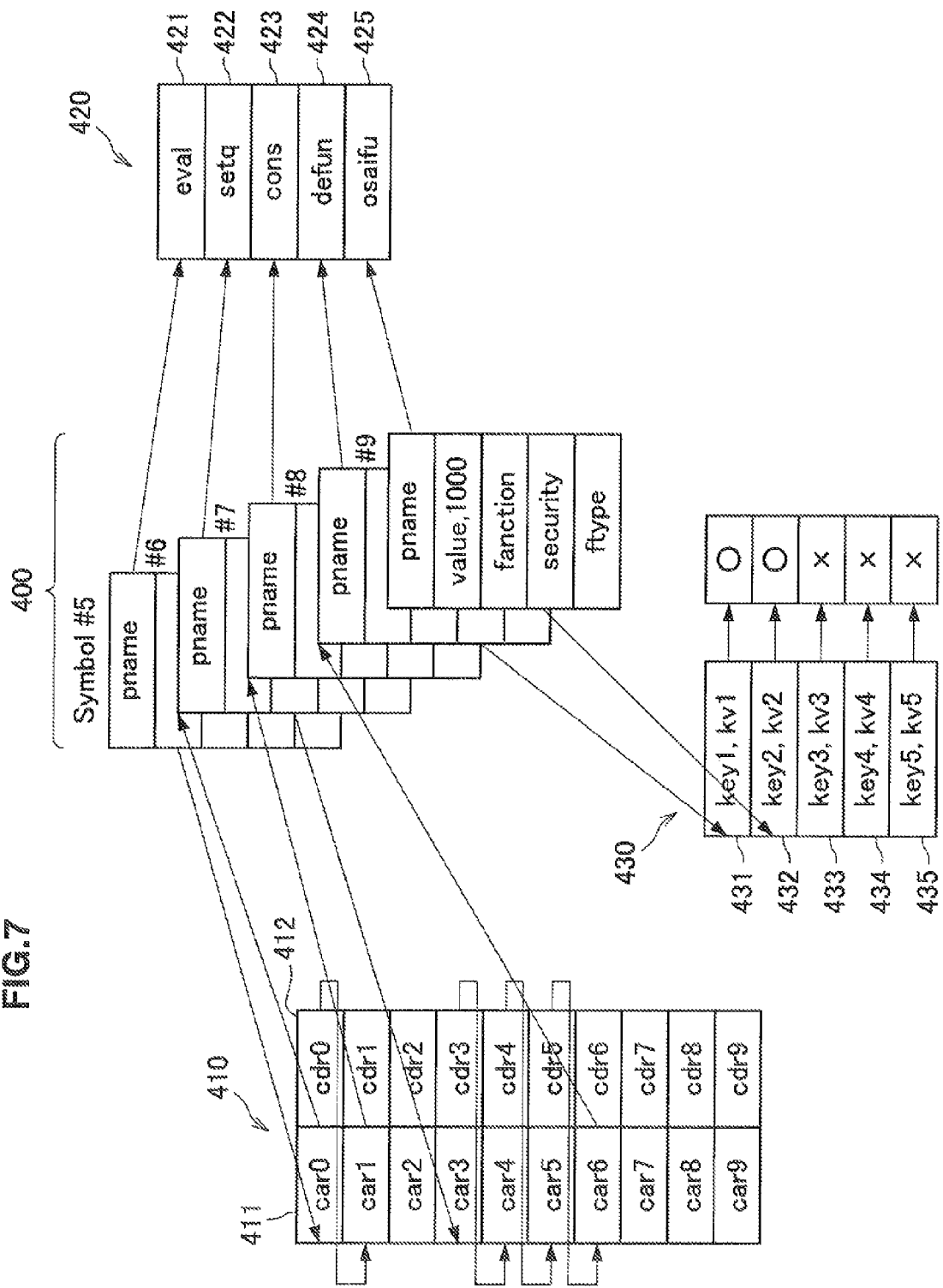
FIG. 7 is an explanatory diagram showing a correspondence relation of the symbol shown in FIG. 3, the cons cell shown in FIG. 4, the name storage table shown in FIG. 5, and the authentication key table shown in FIG. 6.

FIG. 7 is an explanatory diagram showing a correspondence relation of the symbol shown in FIG. 3, the cons cell shown in FIG. 4, the name storage table shown in FIG. 5, and the authentication key table shown in FIG. 6. As described above, the symbol has the region indicating the table of the printable names, the region indicating a value or a list of values, the function attribute, and the security attribute. The function attribute has pointers indicating the type of a function and the substance of the function, and the security attribute has pointers indicating a security flag, a key version and a key. Here, FIG. 7 shows a manner in which the key "key1" denoted by reference numeral 431 and the key "key2" denoted by reference numeral 432 are used in the authentication key table 430 shown in FIG. 6.

Thus, the general structure of the list processing module is called a symbol, and is constituted by the pointer to a numerical value or a list retaining numerical values, the pointer to a function in the case of the function definition, and the pointer indicating the table for storing the printable string.

In the embodiment, in addition to these, the pointer to the table that retains the security attribute and the information of two kinds of encryption keys is added to the symbol. The pointer to one key indicates a master key, and the pointer to the other key indicates an access key (authentication key) for the symbol. The master key is a key with which an authentication must be performed in advance by a mutual authentication feature when altering the security attribute or access key of the symbol. In the content evaluation, content alteration and function execution of the information retained in a symbol, if the security flag set in the symbol is on, having been authenticated with one key added to the symbol is a requirement for using the symbol. The other key is a permission authentication key with which the permission is checked when altering the key of the symbol. For altering the access information, it is required to be in a state of having been authenticated with the permission authentication key.

As shown in FIG. 4, there are, called cons cells, two sets of pointers that show a relation between symbols. They have a structure in which each pointer indicates a cons cell indicating a symbol or another symbol.

A built-in function is written in the ROM 130, and in the first-time power-on of the information processing apparatus 100, the built-in function written in the ROM 130 is defined in the symbol created in the RAM 140. In the subsequent power-on, the symbol that has been already registered is not initialized.

The above configuration has a structure that works similarly when a user registers a new function.

The list processing module that the CPU 110 executes has a configuration in which a symbol can be freely registered and a numerical value, list and function can be freely registered to the symbol. Then, for making use of the security feature on the symbol to be registered, an encryption key and an access flag are registered to the symbol. To the list processing module that the CPU 110 executes, an encryption key that is called a system key is set initially. In a newly registered symbol, the key and access flag specific to the symbol can be set only in a state of being a mode in which a mutual authentication has been performed with the system key (in a state of being the mode 2, described hereinafter). Also, the computer program to be executed by the list processing module that the CPU 110 executes, has a configuration in which the definitions of a variable and function to be used can be altered only in a state of being the mode in which a mutual authentication has been performed with the system key.

In the list processing module that the CPU 110 executes, when registering a function symbol, having been authenticated with all keys for the symbols to be used in the function is a registration requirement. The list processing module has a structure in which when using the registered function subsequently, it is only necessary to have been authenticated with its function execution key.

So far, the structure of the computer program that is executed by the information processing apparatus 100 shown in FIG. 2, has been described. Next, a functional configuration of the CPU 110 of the information processing apparatus 100 will be described.

Figure 8:
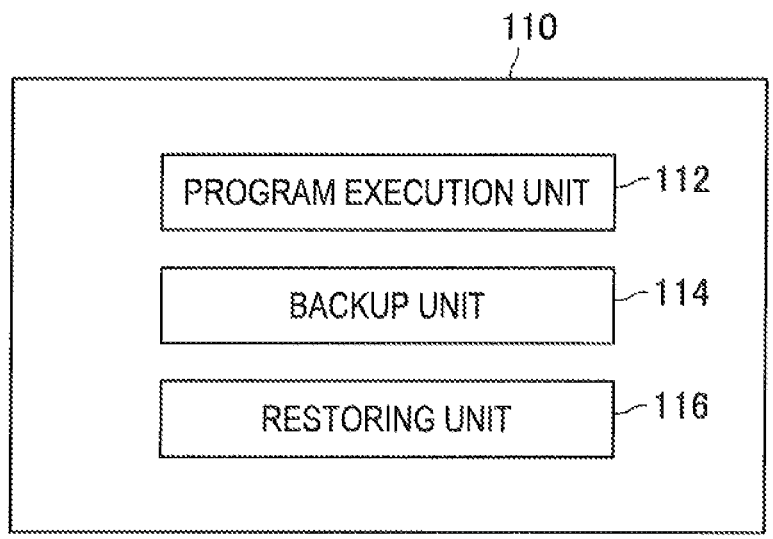
FIG. 8 is an explanatory diagram showing a functional configuration of a CPU 110 according to an embodiment of the present disclosure.
Figure 9:
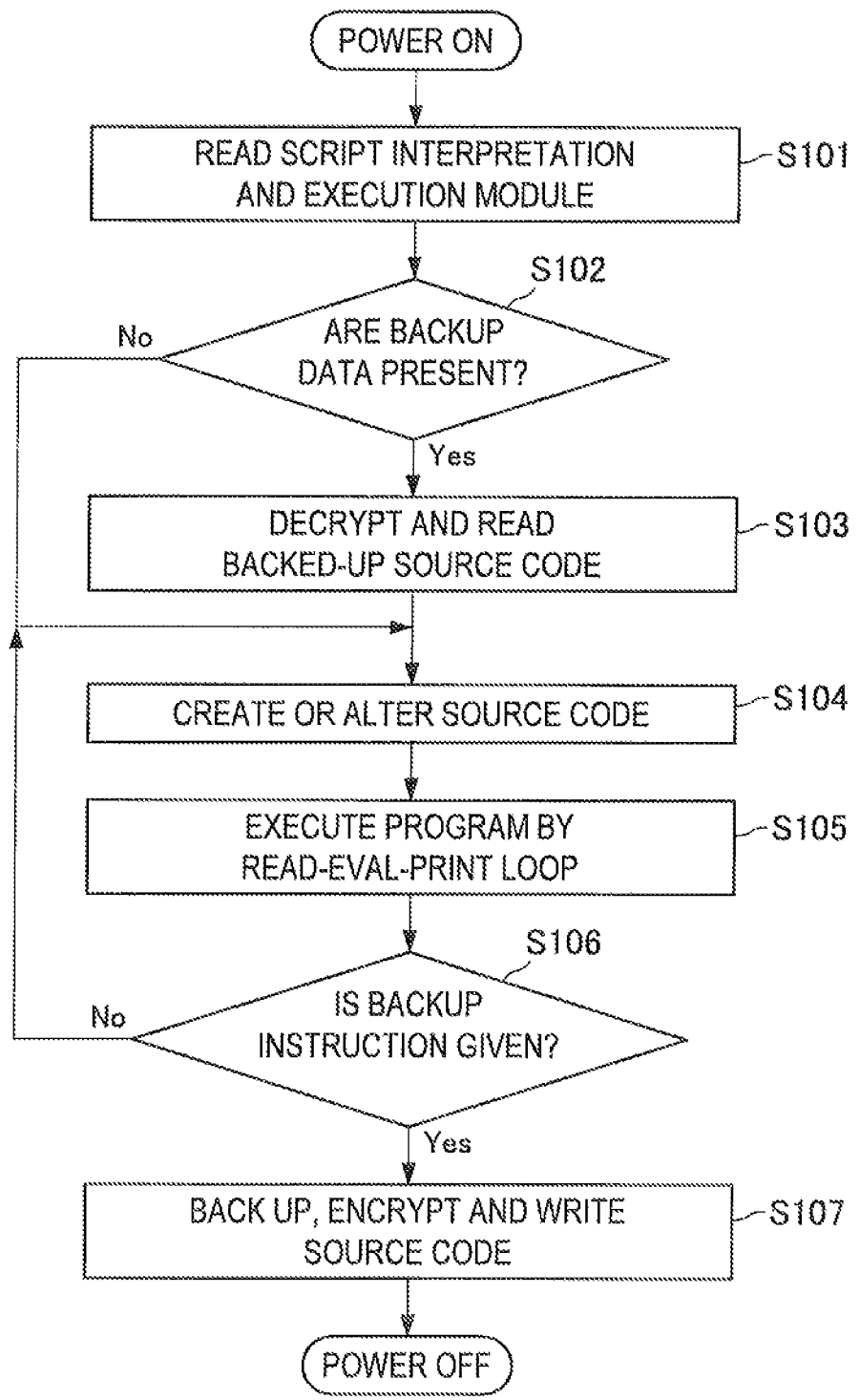
FIG. 9 is a flowchart showing a behavior of an information processing apparatus 100 according to an embodiment of the present disclosure.

FIG. 8 is an explanatory diagram showing the functional configuration of the CPU 110 included in the information processing apparatus 100. In the following, the functional configuration of the CPU 110 will be described using FIG. 8.

As shown in FIG. 8, the CPU 110 is configured to include a program execution unit 112, a backup unit 114 and a restoring unit 116. In the CPU 110 according to an embodiment of the present disclosure, for example, by reading out and executing the computer program that is stored in the ROM 130, the CPU 110 can have a functional configuration shown in FIG. 8.

The program execution unit 112 interprets and executes the code of the computer program that is created in the procedural language. In the embodiment, the program execution unit 112, which has the above-described feature of the list processing module, can read the source code stored in the external storage apparatus 180, and by interpreting the source code, can execute the content described in the source code.

The backup unit 114 backs up, to the external storage apparatus 180, the variable definition and function definition in the computer program that is being executed by the program execution unit 112, in a format that can be interpreted as a code in the above procedural language. In Scheme that is a script language of the Lisp family, for example, in the case of defining the value of a variable a as an S-expression (define a 123) using the "define" for defining the value of a variable, the backup unit 114 backs up the variable definition of this variable a as the S-expression (define a 123). Also, for example, in the case of defining a function "add3" as an S-expression (define (add3 x) (+x 3)), the backup unit 114 backs up the function definition of this function "add3" as the S-expression (define (add3 x) (+x 3)). In backing up of the variable definition and function definition in the computer program, the backup unit 114 may encrypt them using the encryption/decryption unit 120.

The restoring unit 116 reads and restores the data that the backup unit 114 backed up. In the case where, in backing up of the variable definition and function definition in the computer program, the backup unit 114 encrypts them using the encryption/decryption unit 120, the restoring unit 116 may decrypt the read data using the encryption/decryption unit 120 and restore them.

By having such a configuration, the CPU 110 can interpret and execute the code of the computer program that is created in a procedural language, and can back up the variable definition and function definition in the code that is being executed, in a format that the procedural language can interpret with no change. By having such a configuration, it is possible to reduce development steps in a procedural language for the computer program of the information processing apparatus 100, compared to the conventional development steps for the computer program. So far, the functional configuration of the CPU 110 of the information processing apparatus 100 has been described. Next, a behavior of the information processing apparatus 100 shown in FIG. 2 will be described.

[2-3. Behavior of Information Processing Apparatus]

FIG. 10 is a flowchart showing a behavior of the information processing apparatus 100 according to an embodiment of the present disclosure. The flowchart shown in FIG. 10 shows the behavior of the information processing apparatus 100 when the information processing apparatus 100 is powered on and the information processing apparatus 100 executes the list processing module. In the following, the behavior of the information processing apparatus 100 according to an embodiment of the present disclosure will be described with reference to FIG. 10.

Once the information processing apparatus 100 is powered on, the program execution unit 112 of the CPU 110 reads the script interpretation and execution module from the ROM 130 (step S101). Once the script interpretation and execution module is read from the ROM 130 by the program execution unit 112 of the CPU 110 in step S101, subsequently, the program execution unit 112 of the CPU 110 checks whether the backup data of the source code are present in the external storage apparatus 180 (step S102).

As a result of the judgment in the above step S102, if the backup data of the source code are present in the external storage apparatus 180, the program execution unit 112 of the CPU 110 that has read the script interpretation and execution module, reads the backup data of the source code from the external storage apparatus 180 (step S103). In the case where the backup data of the source code are encrypted with a key stored in the NVRAM 150, the CPU 110 that has read the script interpretation and execution module, decrypts the backup data in the restoring unit 116 using the key stored in the NVRAM 150, and reads them in the program execution unit 112 as the script language (step S103). The script interpretation and execution module that has read the backup data as the script language, outputs an input waiting signal to the display unit 170 and becomes a state of waiting an input from an editor of the source code.

By reading the source code read from the external storage apparatus 180, the script interpretation and execution module can read the definitions of the variables and functions described in the source code and the information of the keys specified in the variables and functions, and can execute the program.

After the backup data of the source code have been read from the external storage apparatus 180 in the above step S103, the editor of the source code may make an alteration of the source code (step S104). The script language that is input from the input unit 160 by the editor of the source code is interpreted from an external description format that the interpreter can interpret with no change, to an internal description format that the script interpretation and execution module can interpret after the interpretation by the interpreter, and then is recorded in the RAM 140. As a result of the judgment in the above step S102, if the backup data of the source code are not present in the external storage apparatus 180, the source code is newly created by the editor of the source code (step S104).

Thereafter, the editor of the source code performs a program execution by a READ-EVAL-PRINT loop, using the information processing apparatus 100 (step S105).

In the program creation by the editor of the source code, the program execution unit 112 of the CPU 110 that has read the script interpretation and execution module, always judges whether a backup instruction is given from the editor of the source code (step S106). For example, the editor of the source code may give the backup instruction by operating the input unit 160 and inputting a backup command.

If the backup instruction is given from the editor of the source code, the backup unit 114 of the CPU 110 that has read the script interpretation and execution module, inversely converts the contents of the Symbol table, Code table, name table and key table shown in FIGS. 3 to 6, into the same description format as when they were read in the script interpretation and execution module. The backup unit 114 encrypts the inversely converted data with the key stored in the NVRAM 150, outputs them as encrypted backup data, and then stores them in the external storage apparatus 180 (step S107).

Figure 10A:
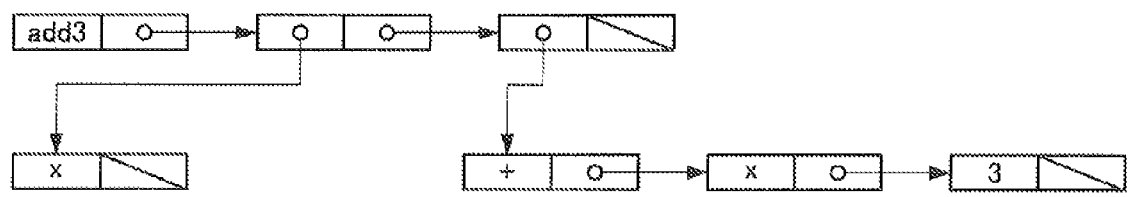
FIG. 10A is an explanatory diagram showing an example of an internal representation.

Here, an example of a backing up of the source code by the backup unit 114 according to the embodiment, is shown. In Scheme that is a script language of the Lisp family, for example, in the case where an S-expression for a function definition is (define (add3 x) (+x 3)), the internal representation has a structure as shown in FIG. 10A. Therefore, in backing up of this function "add3", the backup unit 114 backs it up based on the internal representation shown in FIG. 10A, such that the function definition accords with the above S-expression (define (add3 x) (+x 3)).

Figure 10B:
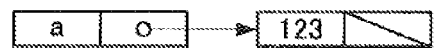
FIG. 10B is an explanatory diagram showing an example of an internal representation.

Also, for example, in the case where an S-expression for a variable definition is (define a 123), the internal representation has a structure as shown in FIG. 10B. Here, suppose the case where the variable value of this variable "a" is altered. For example, once an S-expression for altering the variable value of this variable "a", (set! a 234), is input to the information processing apparatus 100, the value of the variable "a" is altered into "234", and the internal representation gets to have a structure as shown in FIG. 10C.

Figure 10C:
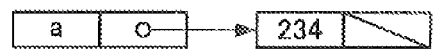
FIG. 10C is an explanatory diagram showing an example of an internal representation.

Then, once the backup unit 114 performs an inverse conversion into the definition of the variable "a", an S-expression (define a 234) is acquired based on the internal representation shown in FIG. 10C. Thus, in backing up, the backup unit 114 can acquire the S-expression for the variable definition from the variable value at the time point of baking up. The same goes for the above-described backup for the function definition, and if the function definition is altered by the editor after the function definition has been read in the script interpretation and execution module, the backup unit 114 can acquire the S-expression for the function definition that is in an altered state.

Thus, by receiving the backup instruction from the editor of the source code and backing up a state when receiving the instruction, for example, in the case of stopping the system once and subsequently restarting the system, the startup recovery of the system is prepared. Furthermore, if intending to know the source code of the program, it can be read out by a function (read-closure-code) incorporated in Scheme or the like, or a function for a backing up, and thereby it is unnecessary to retain the source code in the interior of the information processing apparatus 100 and also it is unnecessary to manage the source code.

Figure 11:
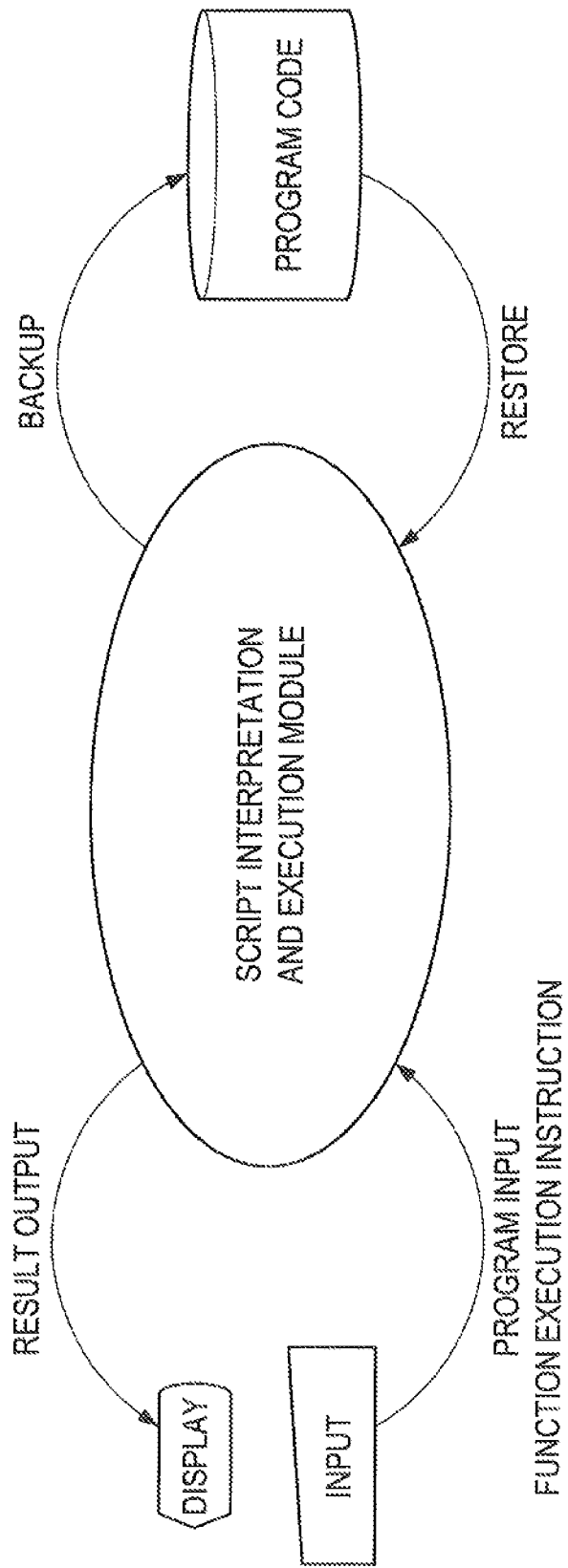
FIG. 11 is an explanatory diagram showing a program development model by an information processing apparatus 100 according to an embodiment of the present disclosure.

FIG. 11 is an explanatory diagram showing a program development model by the information processing apparatus 100 according to an embodiment of the present disclosure. In the information processing apparatus 100 according to an embodiment of the present disclosure, the script interpretation and execution module that is read and executed by the program execution unit 112 of the CPU 110, reads the backup data of the source code stored in the external storage apparatus 180 at the time of startup, and decrypts the backup data using a predetermined key if they are encrypted. The editor of the source code inputs the source code of the program or a function execution instruction using the input unit 160, and the script interpretation and execution module outputs the result to the display unit 170.

Then, once the editor of the source code inputs the backup instruction using the input unit 160, the script interpretation and execution module inversely converts a state at the time point of the backup instruction, into the same description as at the time of the reading in the script interpretation and execution module, and backs it up. In backing up, the backup unit 114 of the CPU 110 may perform an encryption using a predetermined key.

Thus, a successive-addition-type program development is possible by preparing the backup feature for the program, in the script interpretation and execution module. Thereby, even if the scale of the system is larger, it is possible to provide a script execution processing environment that can be securely used while growing the program. It is found that in such a successive-addition-type program development model, the work processes are greatly reduced compared to the conventional program development model shown in FIG. 1.

The backup data are described exactly in the same format as an ordinary script that the script interpretation and execution module receives. Therefore, the reading of the backup data does not require another interface. Furthermore, a script language program that is once read, is encrypted and output with a signature, and therefore it is possible to detect a tampering and protect the internal data from exposure.

In the technology that the present discloser discloses in Japanese Patent Application No. 2011-027625, in the case where the variables and functions are set in such a state that the security flags are set, it is necessary to be authenticated with the respective keys, and the former state is not recovered merely by reading the script program. On the other hand, the restoring method shown in an embodiment of the present disclosure does not require an authentication at every time of encryption key setting, resulting in a simple restart of the system.

After the script language program has been read from files, in some cases, the variable values or function codes are changed by an alteration using the input unit 160 or a running program. In the present disclosure, by a backup instruction, it is possible to back up the changed content in the same description format as at the time of the reading in the script interpretation and execution module, and to obtain the final form of the source code.

The data that are encrypted and stored as the backup data, are decrypted by the script interpretation and execution module and the encryption unit, and the functions, the variable values and the secret keys are restored, and therefore, it is unnecessary to read the script language from the beginning, to reconfigure the variable values, and to reconfigure the encryption keys, resulting in a fast restart of the system.

[2-4. Modifications]

In the above description, the backup data of the script that is read by the script interpretation and execution module to be executed in the information processing apparatus 100, have been described as being stored in the external storage apparatus 180 connected to the information processing apparatus 100. However, the storage of the backup data of the script is not limited to this example.

Figure 12:
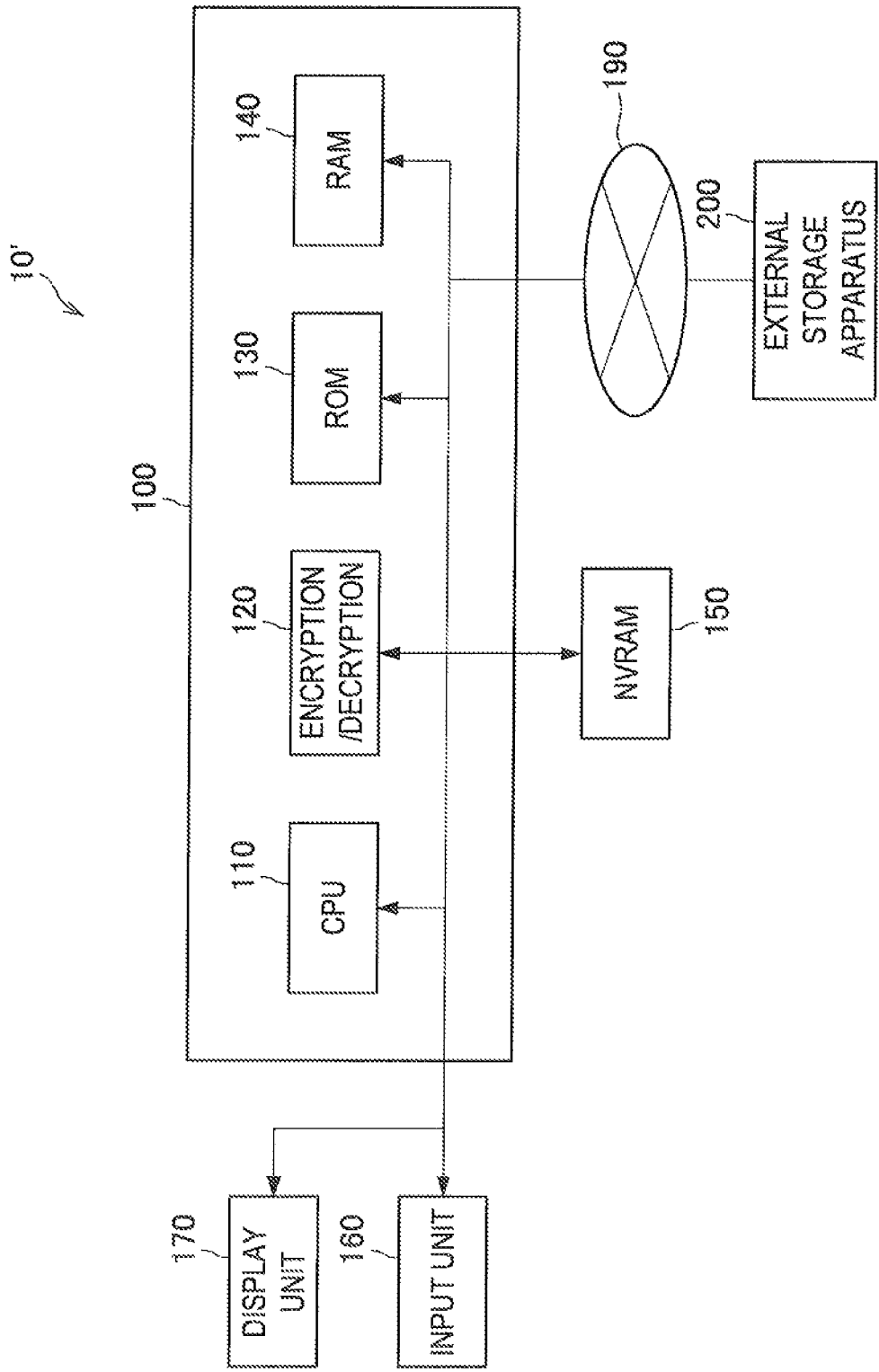
FIG. 12 is an explanatory diagram showing a functional configuration of an information processing system 10' according to an embodiment of the present disclosure.

FIG. 12 is an explanatory diagram showing a configuration of an information processing system 10' according to a modification of an embodiment of the present disclosure. Unlike the information processing system 10 shown in FIG. 2, in the information processing system 10' shown in FIG. 12, an external storage apparatus 200 for storing the backup data of the script is connected with the information processing apparatus 100 via a network 190. Thus, even in a state in which the external storage apparatus 200 for storing the backup data of the script is connected with the information processing apparatus 100 via the network 190, it is still possible to store the backup data of the script in the external storage apparatus 200 and read the backup data of the script from the external storage apparatus 200.

Another modification will be described. After the information processing apparatus 100 has once read the program by the script created in a procedural language, the CPU 110 saves the backup data to the external storage apparatus 180 such as a hard disk that is connected with the information processing apparatus 100, and thereby can automatically read the backup data. Therefore, characteristically, it is unnecessary to read the program again through a keyboard or a network.

Meanwhile, for deleting a once-incorporated function or variable from the backup file saved to the information processing apparatus 100 or the external storage apparatus 180, the delete is impossible unless using means such as an acquisition and editing of the file. Specially, when the backup file is encrypted with a specific secret key that the information processing apparatus 100 has, even the delete by means such as an acquisition and editing of the file is impossible unless being decrypted with the secret key.

If continuing the alteration of the script program, disused variables and function names are generated. The disused variables and functions not only consume the internal resource, but also make it difficult to find whether they are still used, or are disused any more.

Hence, a delete command may be incorporated in the script interpretation and execution module to be executed in the information processing apparatus 100, in order that a user can delete unnecessary variables and functions by executing the delete command. This results in an easy editing of the script program.

[2-5. Hardware Configuration of Information Processing Apparatus]

Figure 13:
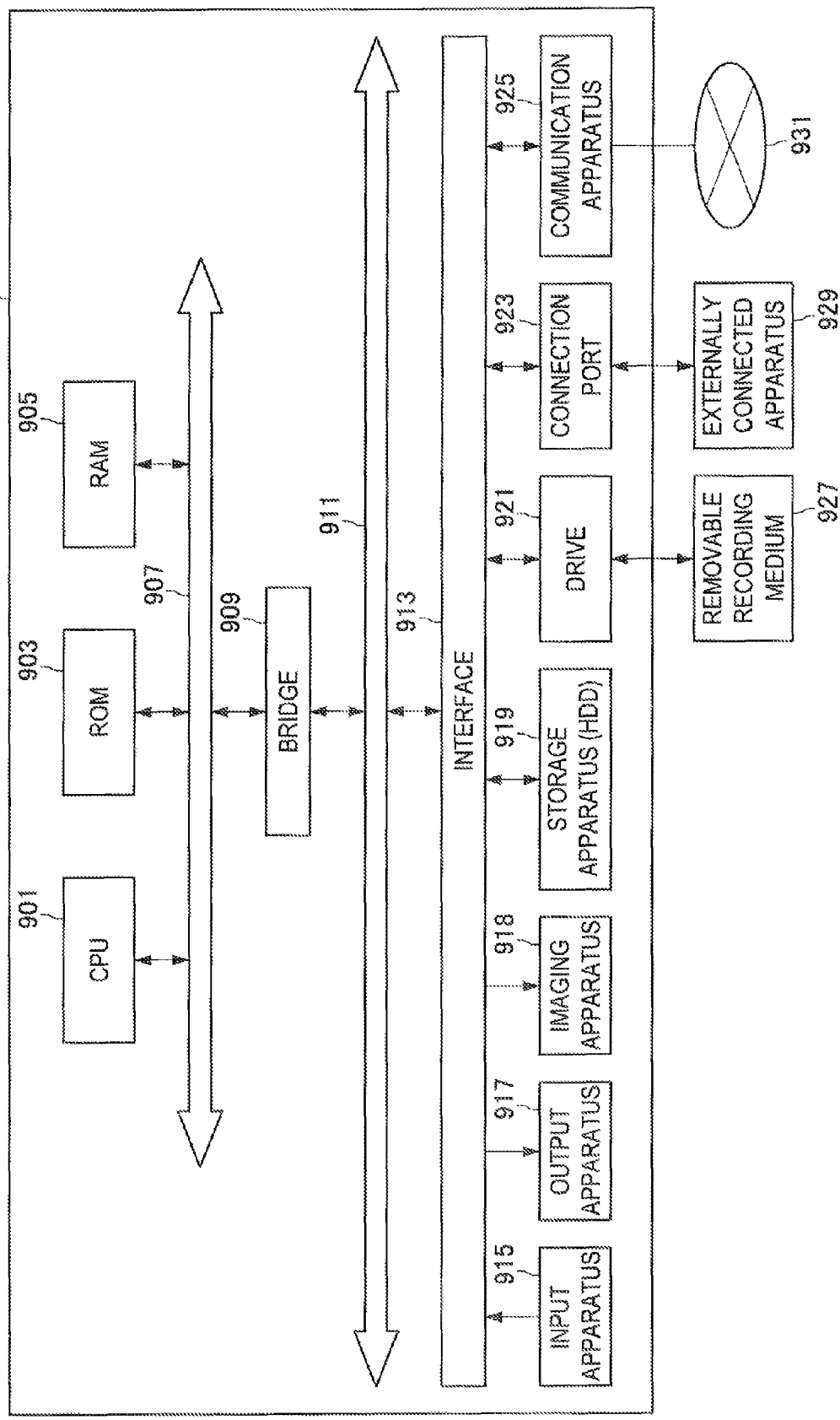
FIG. 13 is an explanatory diagram showing a hardware configuration of the information processing apparatus 100 according to an embodiment of the present disclosure.

Next, a hardware configuration of the information processing apparatus 100 according to an embodiment of the present disclosure will be described in detail with reference to FIG. 13. FIG. 13 is a block diagram for explaining the hardware configuration of the information processing apparatus 100 according to an embodiment of the present disclosure.

The information processing apparatus 100 mainly includes a CPU 901, a ROM 903, a RAM 905, a host bus 907, a bridge 909, an external bus 911, an interface 913, an input apparatus 915, an output apparatus 917, an imaging apparatus 918, a storage apparatus 919, a drive 921, a connection port 923, and a communication apparatus 925.

The CPU 901 serves as an operation processor and a controller, and controls all or some operations in the information processing apparatus 100 in accordance with various programs recorded in the ROM 903, the RAM 905, the storage apparatus 919 or a removable recording medium 927. The ROM 903 stores programs, operation parameters, or the like which are used by the CPU 901. The RAM 905 primarily stores programs which are used in the execution of the CPU 901 and parameters which are appropriately modified in the execution of the programs, or the like. These component members are mutually connected via the host bus 907 made of an internal bus such as a CPU bus.

The host bus 907 is connected to the external bus 911 such as a PCI (Peripheral Component Interconnect/Interface) bus via the bridge 909.

The input apparatus 915 may be an operation device which is operated by a user, such as a mouse, a keyboard, a touch panel, buttons, switches and a lever. The input apparatus 915 may be, for example, a remote control unit (a so-called remote control) using infrared light or other radio waves, or may be an externally connected apparatus 929 such as a mobile phone and a PDA operable in response to the operation of the information processing apparatus 100. Further, the input apparatus 915 includes, for example, an input control circuit which generates an input signal based on information inputted by a user with use of the above-stated operation apparatus and which outputs the input signal to the CPU 901. By operating the input apparatus 915, the user of the information processing apparatus 100 can input various kinds of data into the information processing apparatus 100, and can instruct processing operation.

The output apparatus 917 includes a device capable of visually or audibly notifying the user of acquired information. Examples of such a device include: a display device such as a CRT display device, an LCD device, a plasma display device, an EL display device, and a lamp; a speech output device such as a speaker and a headphone set; a printer; a mobile phone; and a facsimile. The output apparatus 917 outputs, for example, a result obtained by various processings executed by the information processing apparatus 100. More specifically, the display device displays a result obtained by various processings executed by the information processing apparatus 100 in the form of a text or an image. The speech output device converts an audio signal made of reproduced voice data, sound data, or the like into an analog signal, and outputs the analog signal.

The imaging apparatus 918 is mounted on the upper part of a display device, for example, and is capable of imaging still images or moving images of a user of the information processing apparatus 100. The imaging apparatus 918 includes, for example, a CCD (Charge Coupled Device) image sensor or a CMOS (Complementary Metal Oxide Semiconductor) image sensor, and converts light collected by a lens into electric signals so as to image still images or moving images.

The storage apparatus 919 is a device for data storage which is configured as an example of a storage section of the information processing apparatus 100. The storage apparatus 919 includes, for example, a magnetic storage device such as a HDD (hard disk drive), a semiconductor storage device, an optical storage device, or a magneto-optical storage device. The storage apparatus 919 stores programs and various data to be executed by the CPU 901, various data obtained from the outside, such as acoustic signal data and image signal data.

The drive 921 is a reader writer for recording media, which is incorporated in or externally attached to the information processing apparatus 100. The drive 921 reads information recorded on the attached removable recording medium 927, such as a magnetic disc, an optical disc, a magneto-optical disc, and a semiconductor memory device, and outputs the read information to the RAM 905. The drive 921 can also write data in the attached removable recording medium 927, such as a magnetic disc, an optical disc, a magneto-optical disc, and a semiconductor memory device. The removable recording medium 927 includes, for example, DVD media, Blu-ray media, a compact flash (registered trademark) (CompactFlash, CF), a memory stick, an SD memory card (secure digital memory card), or the like. The removable recording medium 927 may also be, for example, an IC card (integrated circuit card) or an electronic device that incorporates a non-contact IC chip, and the like.

The connection port 923 is a port used to directly connect devices to the information processing apparatus 100, for example, a USB (universal serial bus) port, an IEEE1394 port such as i-Link, or the like, and an SCSI (small computer system interface) port, an RS-232C port, an optical audio terminal, and an HDMI (high-definition multimedia interface) port. By connecting the externally connected apparatus 929 to the connection port 923, the information processing apparatus 100 directly acquires acoustic signal data and image signal data from the externally connected apparatus 929, or provides the externally connected apparatus 929 with the acoustic signal data and the image signal data.

The communication apparatus 925 is, for example, a communication interface including a communication device or the like for connection to a communication network 931. The communication apparatus 925 may be, for example, a communication card for a wired or wireless LAN (local area network), Bluetooth, or WUSB (wireless USB), and the like. In addition, the communication apparatus 925 may be a router for optical communication, a router for ADSL (asymmetric digital subscriber line), a modem for various kinds of communications, or the like. The communication apparatus 925 can transmit and receive signals and the like to and from, for example, the Internet or other communication devices based on a predetermined protocol such as TCP/IP. In addition, the communication network 931 connected to the communication apparatus 925 may be made of a network connected in a wired or wireless manner or the like, and may be, for example, the Internet, a home LAN, infrared communication, radio wave communication, satellite communication, or the like.

<3. Conclusion>

As described above, according to an embodiment of the present disclosure, the information processing apparatus 100 that can interpret and execute a procedural programming language, based on a backup instruction by a user (an editor of a source code), inversely converts a state at the time point of the backup instruction, into the same description as at the time of a reading in the script interpretation and execution module, and thereby backs it up to the external storage apparatus 180 connected with the information processing apparatus 100 (or the external storage apparatus 200 connected with the information processing apparatus 100 via the network 190). In backing up of the state at the time point of the backup instruction, it is possible to encrypt it using a key stored in the NVRAM 150.

The data that are backed up to the external storage apparatus 180 connected with the information processing apparatus 100 (or the external storage apparatus 200 connected with the information processing apparatus 100 via the network 190), are read and restored by the script interpretation and execution module, at the time of startup of the information processing apparatus 100. The restoring does not require an authentication with a key in a state in which security flags are set to variables and functions, unlike the technology that the present discloser discloses in Japanese Patent Application No. 2011-027625, and therefore it is possible to recover the former state merely by reading the script program.

The steps shown in the flowchart in the above embodiment include not only processes to be performed in time series along the described order, but also processes to be executed in parallel or independently, which are not necessarily processed in time series. Needless to say, even in steps to be processed in time series, the order can be appropriately changed in some cases.

Furthermore, a series of processes described in the specification may be executed by hardware, software or a composite configuration of hardware and software. In the case of executing the processes by software, a program in which a process sequence is recorded may be installed in the memory of a computer incorporated in dedicated hardware, to be executed, or the program may be installed in a general-purpose computer that can execute various processes, to be executed.

The preferred embodiments of the present invention have been described above with reference to the accompanying drawings, whilst the present invention is not limited to the above examples. A person skilled in the art may find various alternations and modifications within the scope of the appended claims, and it should be understood that they will naturally come under the technical scope of the present invention.

Additionally, the present technology may also be configured as below.

(1)

An information processing apparatus including:

a program execution unit configured to read, interpret and execute a code of a computer program that is created in a procedural language; and a backup unit configured to create a backup in a format in which a variable definition and a function definition in the code being executed by the program execution unit are interpretable as a code in the procedural language.

(2)

The information processing apparatus according to (1), including:

a key retention unit configured to retain a key that is protected by a tamper resistant mechanism; and an encryption and decryption unit configured to perform an encryption and a decryption using the key, wherein the backup unit encrypts a value of a variable defined by the program execution unit at a time point of a backing up, a value of the variable altered by the program, the function definition, and information that is set to the program execution unit and is retained by the program execution unit, with the encryption and decryption unit, and then creates the backup.

(3)

The information processing apparatus according to (2), including:

a restoring unit configured to read the backup created by the backup unit, and to decrypt and restore the read backup using the encryption and decryption unit.

(4)

The information processing apparatus according to (3), wherein the backup unit checks for presence of the backup, and when the backup is present, the program execution unit reads the backup.

(5)

The information processing apparatus according to any one of (1) to (4), wherein the program execution unit deletes the variable definition or the function definition in the read code.

(6)

An information processing method including:

interpreting and executing a code of a computer program that is created in a procedural language; and creating a backup in a format in which a variable definition and a function definition in the code being executed is interpretable as a code in the procedural language.

(7)

A computer program for causing a computer to execute:

interpreting and executing a code of a computer program that is created in a procedural language; and creating a backup in a format in which a variable definition and a function definition in the code being executed are interpretable as a code in the procedural language.

REFERENCE SIGNS LIST 10 information processing system
100 information processing apparatus
110 CPU
112 program execution unit
114 backup unit
116 restoring unit
120 encryption/decryption unit
130 ROM
140 RAM
150 NVRAM
160 input unit
170 display unit
180, 200 external storage apparatus

The invention claimed is:

1. An information processing apparatus comprising:
a program execution unit configured to read, interpret and execute a code of a computer program that is created in a procedural type programming language which enables security to be set independently for a variable and a function,
wherein the information defining a value of the variable in the code and information defining a value of the function in the code are created in a predetermined format of the procedural type programming language by a user; and
a backup unit configured to create a backup, in the predetermined format, of the information defining the value of the variable and the information defining the value of the function in the code of the procedural type programming language.

2. The information processing apparatus according to claim 1, comprising:
a key retention unit configured to retain a key that is protected by a tamper resistant mechanism; and
an encryption and decryption unit configured to perform an encryption and a decryption using the key,
wherein the backup unit encrypts the value of a variable defined by the program execution unit at a time point of a backing up, a value of the variable altered by the program, the value of the function, and information that is set to the program execution unit and is retained by the program execution unit, with the encryption and decryption unit, and then creates the backup.

3. The information processing apparatus according to claim 2, comprising: a restoring unit configured to read the backup created by the backup unit, and to decrypt and restore the read backup using the encryption and decryption unit.

4. The information processing apparatus according to claim 3, wherein the backup unit checks for presence of the backup, and when the backup is present, the program execution unit reads the backup.

5. The information processing apparatus according to claim 1, wherein the program execution unit deletes the information definition value of the variable or the information defining the value of the function in the read code.

6. An information processing method for use with an information processing apparatus having a processing device, said method comprising:
interpreting and executing, by use of the processing device, a code of a computer program that is created in a procedural type programming language which enables security to be set independently for a variable and a function,
wherein information defining a value of the variable in the code and information defining a value of the function in the code are created in a predetermined format of the procedural type programming language by a user; and
creating a backup, in the predefined format, of the information defining the value of the variable and the information defining the value of the function in the code of the procedural type programming language.

7. A non-transitory computer-readable storage medium having stored thereon, a set of computer-executable instructions for causing a computer to perform steps comprising:
interpreting and executing a code of a computer program that is created in a procedural type programming language which enables security to be set independently for a variable and a function,
wherein information defining a value of the variable in the code and information defining a value of the function in the code are created in a predetermined format of the procedural type programming language by a user; and
creating a backup, in the predetermined format, of the information defining the value of the variable and the information defining the value of the function in the code of the procedural type programming language.

8. The information processing apparatus according to claim 1, in which the procedural type programming language is LISP.

* * * * *